United States Patent [19]

Shedd et al.

[11] 4,083,141
[45] Apr. 11, 1978

[54] SWAGED INTEGRAL BUTT AND REEL SEAT FOR FISHING ROD

[75] Inventors: William D. Shedd, Newport Beach; Lawrence F. Belden, Pacific Palisades, both of Calif.

[73] Assignees: Axelson Fishing Tackle Mfg. Co., Inc., Newport Beach; James D. Easton Inc., Van Nuys, both of Calif.

[21] Appl. No.: 738,735

[22] Filed: Nov. 4, 1976

[51] Int. Cl.² ............................................. A01K 87/06
[52] U.S. Cl. ............................................. 43/22; 43/23
[58] Field of Search .............. 43/22, 23, 18 R, 18 GF; D22/26, 23

[56] References Cited

U.S. PATENT DOCUMENTS

| 831,764 | 9/1906 | Bartlett | 43/22 |
| 1,450,700 | 4/1923 | Mull | 43/18 R |
| 1,624,052 | 4/1927 | Heddon et al. | 43/22 |
| 3,364,612 | 1/1968 | Holahan | 43/22 |
| 3,443,335 | 5/1969 | Guydos | 43/22 |

FOREIGN PATENT DOCUMENTS 1,540,505  8/1968  France ..................................... 43/22

Primary Examiner—Russell R. Kinsey
Assistant Examiner—Robert P. Swiatek
Attorney, Agent, or Firm—Gausewitz, Carr & Rothenberg

[57] ABSTRACT

An integral butt and reel seat for an offshore trolling rod is made by swaging a unitary tubular member to form a rearwardly tapering butt section, a transition section tapering forwardly from a forward end of the butt section to a decreased diameter and a cylindrical reel seat section that extends forwardly from the transition section and has a forward end thereof threaded for reception of an adjustable threaded reel hood. A second reel hood is fixed to the reel seat section and the forward end of the tubular member is sealed by means of a plug inserted deep within the reel seat section and provided with a forwardly projecting rib that aligns a rod ferrule slidably received within the forward end of the integral member. A gimbal knock is fixed to and seals the rear end of the integral member.

11 Claims, 5 Drawing Figures

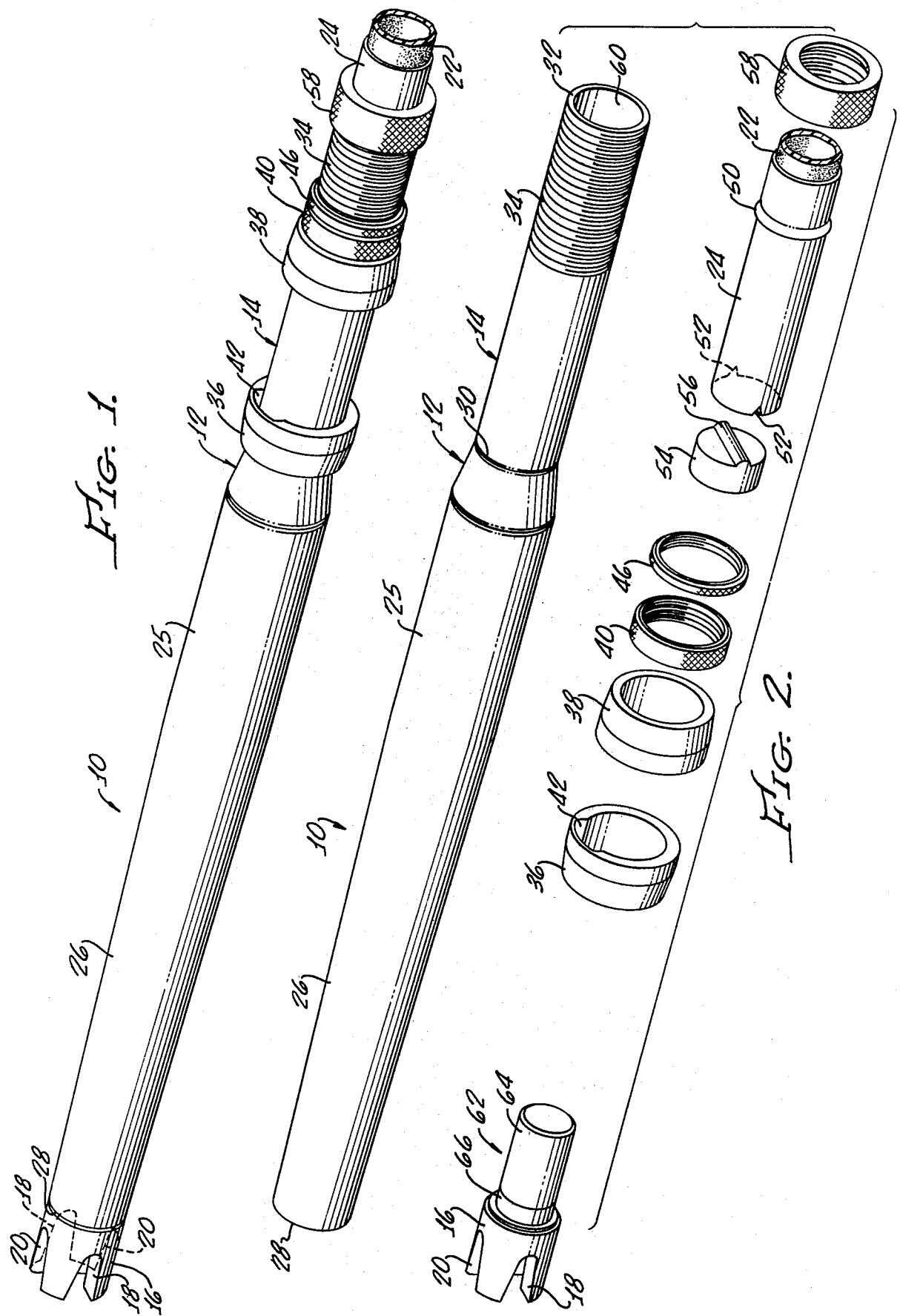

SWAGED INTEGRAL BUTT AND REEL SEAT FOR FISHING ROD

BACKGROUND OF THE INVENTION

This invention relates to fishing rods and more particularly concerns a rod having an improved combination of butt and reel seat that provides increased strength and decreased weight in a greatly simplified arrangement.

Offshore trolling rods for deep sea fishing and surf casting rods are often formed of three main sections — the rod itself, the rear butt section which provides a long handle and a firm, solid support for the rod assembly, and a reel seat section between the butt and the rod. The rearmost end of the butt section of the trolling rod may be provided with a gimbal knock in the form of a transversely notched end to support the rod in a given position of alignment with respect to a rod gimbal. Commonly, the rod butt, which is of a convenient length for handling as may be necessary or desirable in deep sea fishing, is formed with a forwardly extending tenon or pin which slidably receives a hollow reel seat having fixed and movable reel hoods mounted thereon. The reel seat slidably receives a forward tenon of the butt and is fixed upon this tenon. The rod itself has a metallic ferrule at its rear end which is notched and detachably received within the reel seat, the ferrule notch seating upon an alignment pin extending through the reel seat to insure rotational alignment of the rod and reel seat about the rod axis.

Large bending forces are applied to the rod assembly, being applied to the butt by the great leverage of the rod itself. Thus offshore trolling rods and surf casting rods are most likely to break, under long use and great bending stresses, at the junction of the reel seat and the butt section. Specifically, in prior constructions that point of the butt section at which a shoulder is formed by the junction of the butt tenon and the body portion of the butt provides a decreased diameter and a relatively sharp step or shoulder to concentrate stresses at the portion of decreased diameter, thus creating a greater probability of breakage at this point. Furthermore, in this construction, where the seat section is slidably received on the butt tenon and then adhesively secured, it is essential that the tenon and seat be precisely sized for a good, close fit and that these elements be precisely aligned. Thus decreased tolerances and increased cost of manufacture result. Alternatively, a poor fit of the reel seat upon the butt tenon and a considerably weaker rod assembly are obtained.

To avoid the need to assemble upon the butt section a completely separate seat section, a butt has been made which is bored to receive a separate tubular insert inserted into and fixed to its forward end. This insert itself forms the reel seat, having a reel hood fixed to its rear end and receiving at its forward end an adjustable reel hood. A rod ferrule aligning pin extends transversely through holes drilled through the seat section.

This arrangement of a tubular insert still faces the problems of precisely sizing the two telescoped parts and aligning the bore drilled in the butt section. Further, the use of an aligning pin greatly adds to the complexity and cost of finishing the rod assembly since those areas at which the ends of the pin protrude from the sides of the seat section must be carefully machined and finished to provide a satisfactory appearance and a smooth surface to avoid interference with the reel.

Accordingly it is an object of the present invention to provide a rod assembly having a butt and reel seat that minimizes or eliminates above-mentioned problems.

SUMMARY OF THE INVENTION

In carrying out principles of the present invention in accordance with a preferred embodiment thereof, a unitary tubular member is swaged to form a butt section having a desired butt configuration, a transition section which tapers forwardly from a forward end of the butt section to a decreased diameter, and a cylindrical reel seat section extending forwardly from a forward end of the transition section and provided with means to fasten a forward reel hood thereon. A rearward reel hood is fixed to a rearward portion of the seat section. Swaging of the unitary member, and in particular swaging of the tapering transition section, provides optimum wall thicknesses at different portions of the member and eliminates points of increased stress concentration. To both seal the interior of the seat section and to provide rod ferrule alignment means, there is fixed deep within the seat section a sealing plug having means on a forward portion thereof for aligning a ferrule attached to the end of a rod inserted into the seat section.

BRIEF DESCRIPTION OF THE DRAWINGS

FIG. 1 is a perspective view of an integral butt and reel seat embodying principles of the present invention;

FIG. 2 is an exploded view of elements of a rod assembly constructed in accordance with the principles of the present invention with portions of the rod being broken away;

DETAILED DESCRIPTION

Figure 3:
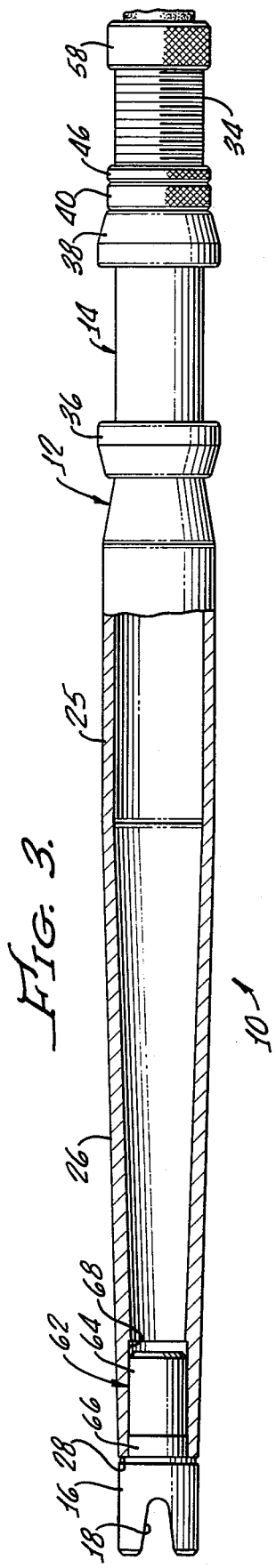
FIG. 3 is a side view of the butt and reel seat of FIG. 1 with portions broken away.

An integral butt and reel seat embodying principles of the present invention includes a butt section 10, a transition section 12 and a reel seat section 14. Fixed to the rear end of butt section 10 is a gimbal knock 16 having mutually orthogonal pairs of aligned tapered recesses 18 and 20.

Figure 4:
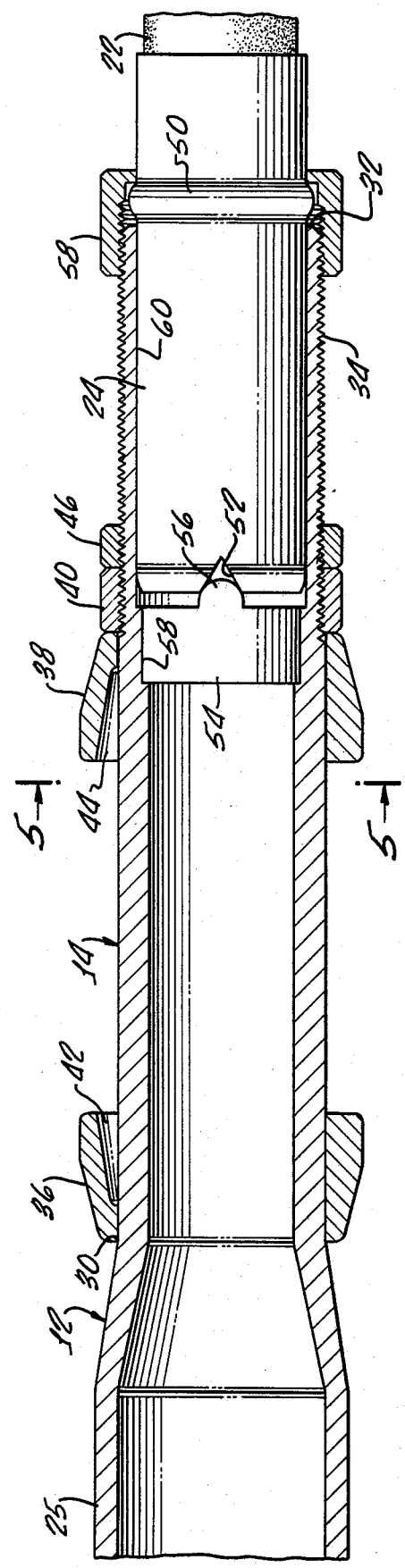
FIG. 4 is an enlarged sectional view of forward portions of the integral tubular member.
Figure 5:
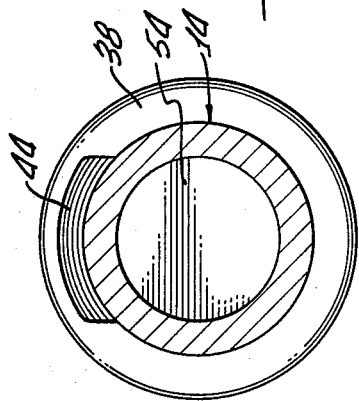
FIG. 5 is a section taken on line 5—5 of FIG. 4.

A fishing rod 22 of a conventional long, slender, fiberglass or similar construction, has affixed to its rear end a metallic ferrule 24 that is slidably received within the forward end of the reel seat section of the integral rod and reel seat. As can be seen in FIGS. 2, 3 and 4, the integral tubular member is formed of a single element including butt section 10, transition section 12 and seat section 14. The member is formed by swaging a metallic tube, such as an aluminum or stainless steel tube, of a given length and of an initial diameter equal to the maximum outside diameter of the desired configuration. Swaging of the tube, employing conventional swaging techniques, provides an integral member having a butt section 10 with a forward cylindrical portion 25 of the maximum and original diameter of the tube. The butt section tapers rearwardly through a portion 26 to a smaller diameter at the rear end 28 of the butt section. Transition section 12 tapers forwardly from a forward end of the butt section cylindrical portion 25, which is of the initial larger diameter, to a decreased diameter portion at point 30 (FIG. 4) where the reel seat section 14 begins. The reel seat section is swaged to a circular cylindrical configuration and extends forwardly of the integral member from the forward end of transition section 12 to the forward end of the integral member indicated at 32. The exterior of the seat section 14, for a significant distance rearwardly of the forward end 32, is threaded as indicated at 34.

Fixed to and upon reel seat section 14, at a rear portion thereof adjoining the forward end of transition section 12, is a first reel hood 36. Preferably hood 36 is secured to the reel seat section by an epoxy adhesive. However, this hood may also be a press fit upon the rear portion of the seat section, such a press fit being provided by slightly enlarging the rear portion of the seat section, just forward of transition section 12, with respect to the remainder of the seat section. With such enlargement, the reel hood may be inserted over the seat section with relative ease for the major length of the seat section and will require pressing force for only the last portion of its insertion over and upon the seat section.

An adjustable, movable reel hood 38 is slidably mounted on the seat section and adjustably positioned by a reel hood nut 40 threaded on the seat section. Thus, the hood 38 and its nut 40 may be inserted over the threaded end portion of reel seat section 14 and the hood 38 may be adjustably positioned and forced axially along the reel seat section by rotation of nut 40. It will be readily understood that the conventional reel (not shown) has forward and rearwardly projecting feet which are received and locked within recesses 42, 44 formed in hoods 36 and 38 respectively. To hold the adjustable hood 38 in a selected position there is provided a threaded lock nut 46.

The end of the rod itself is conventionally fixed as by an epoxy or other adhesive, to and within the body of metallic ferrule 24 which has an enlarged circumferential ridge 50 at a forward portion thereof and a pair of diametrically aligned rearwardly facing grooves 52 formed in the rearward end thereof. These grooves are employed for rotational alignment of the rod and ferrule with respect to the reel hoods, 36, 38 and, therefore, with respect to the reel that is securely mounted to and aligned with the reel hoods.

According to a feature of the present invention, the ferrule and rod are aligned with the butt and reel seat by cooperation with a plug 54 that is fixed deep within the forward end of the seat section of the integral member. Plug 54 performs two separate functions. First, because it is a close fit within and is sealed to the seat section, it seals the interior of the integral tubular (hollow) member against entry of corrosive sea water. This plug also performs a rod and ferrule alignment function. Such alignment function has been previously provided by a separate pin that extends transversely through the seat section to be secured at its ends in apertures in the reel seat wall. The prior pin has its ends carefully cut and polished to provide a smooth exterior surface of the reel seat. Such a pin is not employed, nor is it needed, in the present arrangement. The alignment function of such a pin is achieved by the sealing plug 54 which is formed with a diametrally extending rib 56 that projects axially forwardly of the plug and seats within the pair of diametrically opposed grooves 52 formed in the rear end of the ferrule 24.

It will be understood that plug 54 is carefully aligned (rotationally about the axis of the rod) with respect to the rotational position of reel seat section 14 so that the reel, when secured to the reel seat, will be properly aligned with the rod. the rod itself is aligned by the plug 54. Similarly, the notches in the gimbal knock must be properly oriented about the axis of the rod with respect to the plug 54 and fixed reel hood 36.

In swaging of a tube the interior surface becomes somewhat irregular. Thus the interior of the forward portion of the seat section of this integral member is drilled, reamed or otherwise machined, to provide a smooth cylindrical interior surface of a diameter to snugly but detachably receive the end of the rod ferrule 24. A conventional nut 58 engages the peripheral ridge 50 and is threaded upon the seat section to hold the ferrule and rod in place within the reel seat section.

Since the plug 54 must be securely fixed to and within the seat section in order to provide both its sealing function and its alignment function, this plug is secured by use of both an adhesive and a press fit. Thus no apertures need be formed in the walls of the tubular member of seat section. To facilitate the press fit of plug 54 deep within the interior of the seat section, and to avoid the necessity of pressing this plug through a significant portion of the length of the seat section, a portion 58 of the interior of the seat section immediately to the rear of the forward end portion 60 that receives the rod ferrule is bored to a diameter slightly smaller than the diameter of such forward end portion. Thus the plug 54 may be readily and easily inserted into the seat section from its forward end through the length of its large internal diameter portion 60 and then pressed into the smaller diameter portion 58. Such a combination of epoxy adhesive and press fit provides a good seal and firm anchoring of the aligning plug 54 against rotation about the axis of the rod without any fastening devices extending through the walls of the tubular member.

The rear end of the unitary butt and reel seat, at the rear of the butt section, is sealed by the gimbal knock 16 which has a forwardly projecting integral tenon 62 of which a forward portion 64 is of a slightly smaller diameter than a rear portion 66. The diameter of portion 66 of tenon 62 of the gimbal knock is made to be a press fit within the rearmost length of about $\frac{1}{4}$ to $\frac{1}{2}$ inch of the butt section which is bored out to a diameter sufficient to receive the large diameter portion 66 in a press fit relation. Thus the smaller diameter portion 64 of tenon 62 will readily slide into the bored out portion 68 of the rear of the butt section but the larger diameter portion 66 is a press fit therein. A suitable epoxy or other adhesive further aids in securement and sealing of the gimbal knock into the butt section.

A surprising and unexpected advantage of swaging to provide the integral tubular butt and reel seat sections is the fact that the wall thicknesses of the various portions of the tubular member are varied by the swaging operation to provide optimum wall thicknesses for both higher strength and lighter weight. Thus, the swaging operation provides a thinner wall section at parts of the tubular member that are of a larger diameter and a thicker wall section at parts that are of a smaller diameter. The larger diameter sections, having an inherently greater resistance to bending, have lesser wall thickness and the smaller diameter section, having a lesser resistance to bending (by virtue of the smaller diameter), has a greater wall thickness.

As best seen in FIGS. 3 and 4, cylindrical portion 25 of the butt section has the largest outside diameter and has the smallest wall thickness, this portion having basically the same diameter and wall thickness as the starting tube. Swaging operation thickens the walls and thus as the butt section tapers over portion 26 to a smaller diameter end, its wall thickness increases. Similarly, as shown in FIG. 4, as the transition section 12 tapers forwardly from butt section 25 to a smaller diameter at seat section 14, the wall thickness of the transition section increases to a relatively thicker wall section obtained throughout the length of the reel seat section by the swaging operation. Therefore, at point 30, the junction of the reel seat section and transition section where the swaged tubular member has a decreased outside diameter, its wall thickness is greatest and thus its resistance to bending is greatest. In this way, the swaging operation significantly improves bending strength and decreases weight by first providing a smooth transition from the large diameter butt section 10 to the smaller diameter reel seat section 14 and second by increasing the wall thickness at the smaller diameter section. Thick walls at larger diameter sections are avoided and thus weight is decreased without undue loss of strength.

As an example of the sizes of the butt and rod seat assembly, a relatively larger assembly may be in the order of 20 inches long, having a maximum diameter of slightly less than 1½ inches, an outside diameter at the reel seat section of about 1¼ inches and a minimum diameter at the rear end of the butt section of about 1 inch. The transition section may be somewhat more than ½ inch in length and the reel seat just less than 5½ inches in length. For a shorter rod and butt seat assembly, the cylindrical portion 25 of the butt section may be eliminated so that the entire butt section tapers from a maximum diameter at the transition section rearwardly to its minimum diameter.

The foregoing detailed description is to be clearly understood as given by way of illustration and example only, the spirit and scope of this invention being limited solely by the appended claims.

What is claimed is:

1. An integral butt and reel seat for a fishing rod comprising
   a unitary tubular member swaged to form a plurality of integral sections including
      a butt section tapering from a maximum diameter at a forward portion thereof to a minimum diameter at a rear portion, and having a wall thickness that increases towards its smaller diameter portion,
      a transition section tapering forwardly from the forward end of said butt section to a decreased diameter and having a wall thickness that increases toward said decreased diameter, and
      a cylindrical reel seat section extending forwardly from a forward end of said transition section,
      said reel seat section including a threaded portion,
      a first reel hood secured to said seat section, means on said seat section for mounting a rod thereto, and
      a movable reel hood threaded upon said cylindrical reel seat section.

2. An integral butt and reel seat for a fishing rod comprising
   a unitary tubular member swaged to form a plurality of integral sections including
      a butt section,
      a transition section tapering forwardly from a forward end of said butt section to a decreased diameter,
      a cylindrical reel seat section extending forwardly from a forward end of said transition section,
      said seat section having hood fastening means at a first portion thereof,
      a first reel hood fixed to a second portion of said seat section spaced from said first portion,
      a second reel hood adjustably mounted on said seat section and engaged with said hood fastening means,
      means for mounting a rod to the forward end of said seat section, said means for mounting a rod comprising
         a plug sealed within said seat section and having rod end aligning means on a forward end thereof,
         a forward end portion of said seat section of said unitary tubular swaged member being internally enlarged to a first diameter for snug but sliding reception of a fishing rod end ferrule, and
         a plug receiving portion of said seat section immediately to the rear of said forward end portion being internally enlarged to a second diameter that is smaller than said first diameter, said plug being a press fit in said plug receiving portion to thereby lock and seal said plug to and within said seat section at a position rearwardly of the forward end thereof.

3. An intergal butt and reel seat for a fishing rod comprising
   a unitary tubular member swaged to form a plurality of integral sections including
      a butt section,
      a transition section tapering forwardly from a forward end of said butt section to a decreased diameter,
      a cylindrical reel seat section extending forwardly from a forward end of said transition section,
      said seat section having hood fastening means at a first portion thereof,
      a first reel hood fixed to a second portion of said seat section spaced from said first portion, a second reel hood adjustably mounted on said seat section and engaged with said hood fastening means, means for mounting a rod to the forward end of said seat section, said butt section tapering rearwardly from a larger diameter to a smaller diameter rear end, and said unitary tubular member having a relatively small wall thickness at said larger diameter portion of said butt section and having a relatively large wall thickness at the junction of said transition section and said cylindrical reel seat section, whereby increased strength is provided by the combination of tapering of said transition section and the increased wall thickness at the decreased diameter cylindrical reel seat section.

4. The apparatus of claim 3 wherein said hood fastening means comprises a reel hood nut and external threads formed on said seat section for receiving said reel hood nut.

5. The apparatus of claim 3 wherein said means for mounting a rod comprises means fixed to and sealed within said seat section for sealing the interior thereof and for aligning a rod end inserted into the forward end of said seat section.

6. The apparatus of claim 5 wherein said last mentioned means comprises a plug sealed within said seat section and having rod end aligning means on a forward end thereof.

7. The apparatus of claim 5 wherein said last mentioned means comprises a cylindrical plug sealed within said seat section and having a forwardly projecting diametral rib.

8. The apparatus of claim 3 including gimbal knock fixed to the rearward end of said butt section.

9. A method of forming a butt and reel seat for a fishing rod comprising the steps of
swaging a unitary tubular member to form a plurality of integral sections including
a butt section tapering from a maximum diameter at a forward portion thereof to a minimum diameter at a rear portion, and having a wall thickness that increases towards its smaller diameter portion, a transition section tapering forwardly from the forward end of said butt section to a decreased diameter and having a wall thickness that increases toward said decreased diameter, and
a cylindrical reel seat section extending forwardly from a forward end of said transition section,
forming threads on a portion of said reel seat section,
securing a first reel hood to said seat section, providing a rod mounting configuration on said seat section, and
threading a movable reel hood upon said threaded cylindrical reel seat section.

10. A method of forming a butt and reel seat for a fishing rod comprising the steps of
swaging a unitary tubular member to form a plurality of integral sections including
a butt section tapering from a maximum diameter at a forward portion thereof to a minimum diameter at a rear portion, and having a wall thickness that increases towards its smaller diameter portion, a transition section tapering forwardly from the forward end of said butt section to a decreased diameter and having a wall thickness that increases toward said decreased diameter, and
a cylindrical reel seat section extending forwardly from a forward end of said transition section,
forming threads on an end portion of said reel seat section,
securing a first reel hood to a rearward portion of said seat section,
forming a smooth bore of selected size in a forward portion of said reel seat section, forming a cylindrical sealing plug with a diametral ridge on a forward face thereof, fixing said sealing plug to and within said reel seat section bore with said ridge facing forwardly, and
threading a movable reel hood upon said threaded cylindrical reel seat section.

11. The method of claim 10 wherein said step of forming a smooth bore comprises forming a bore of a first diameter within a forward portion of said reel seat section, and forming a bore of a slightly lesser diameter than said first diameter in a portion of said reel seat section immediately to the rear of said first mentioned portion, and wherein said step of securing a plug within said reel seat section comprises driving said plug into said second bore of lesser diameter in a press fit relation thereto.

* * * * *

UNITED STATES PATENT AND TRADEMARK OFFICE
CERTIFICATE OF CORRECTION

PATENT NO. : 4,083,141
DATED : April 11, 1978
INVENTOR(S) : William D. Shedd and Lawrence F. Beldon It is certified that error appears in the above-identified patent and that said Letters Patent are hereby corrected as shown below:

Col. 4, line 18 change "of" first occurrence to --or--.

Signed and Sealed this

Seventeenth Day of October 1978

[SEAL]

Attest:

RUTH C. MASON
Attesting Officer

DONALD W. BANNER
Commissioner of Patents and Trademarks